United States Patent [19]
Abe

[11] Patent Number: 5,787,467
[45] Date of Patent: Jul. 28, 1998

[54] CACHE CONTROL APPARATUS

[75] Inventor: Kenji Abe, Ibaraki, Japan

[73] Assignee: NEC Corporation, Tokyo, Japan

[21] Appl. No.: 621,203

[22] Filed: Mar. 21, 1996

[30] Foreign Application Priority Data

Mar. 22, 1995 [JP] Japan ................... 7-062846

[51] Int. Cl.$^6$ .................................................. G06F 12/00
[52] U.S. Cl. ........................... 711/118; 711/113; 711/124; 711/202
[58] Field of Search ................... 365/189.02; 395/403, 395/458, 460, 455, 467, 440, 421.06; 711/3, 131, 133, 128, 140, 113, 216

[56] References Cited

U.S. PATENT DOCUMENTS

| | | | |
|---|---|---|---|
| 4,219,883 | 8/1980 | Kobayashi et al. | 365/189.02 |
| 4,954,944 | 9/1990 | Ikeda | 395/403 |
| 5,228,135 | 7/1993 | Ikumi | 395/458 |
| 5,274,790 | 12/1993 | Suzuki | 395/460 |
| 5,539,894 | 7/1996 | Webber | 395/455 |
| 5,559,985 | 9/1996 | Maemura | 395/467 |
| 5,584,003 | 12/1996 | Yamaguchi et al. | 395/403 |
| 5,652,857 | 7/1997 | Shimoi et al. | 395/440 |
| 5,659,699 | 8/1997 | Breternitz, Jr. | 395/421.06 |

FOREIGN PATENT DOCUMENTS 4-209049 7/1992 Japan.

*Primary Examiner*—Tod R. Swann
*Assistant Examiner*—Fred Fei Tzeng
*Attorney, Agent, or Firm*—Sughrue, Mion, Zinn, Macpeak & Seas, PLLC

[57] ABSTRACT

A cache control apparatus for controlling address mapping of a cache memory which can dynamically change the mapping algorithm of the address mapping. The cache control apparatus has a plurality of mapping controllers individually provided for different mapping algorithms each for producing a set address and an address tag in response to an output of said address register, a mapping algorithm controller for selecting one of the mapping controllers and outputting a selector control signal, a first selector for selecting one of the set addresses outputted from the mapping controllers, a second selector for selecting one of the address tags outputted from the mapping controllers, a comparison circuit for comparing the address tags outputted from the second selector and a tag memory, a hit discrimination circuit for discriminating a cache hit based on a result of the comparison by the comparison circuit, and hit ratio calculation means for calculating a cache hit ratio. The mapping algorithm controller selecting one of the mapping controllers based on the cache hit ratio calculated by the hit ratio calculation means.

7 Claims, 2 Drawing Sheets

CACHE CONTROL APPARATUS

BACKGROUND OF THE INVENTION

1. Field of the Invention

This invention relates to a cache control apparatus for controlling a cache memory for a computer system, and more particularly to a cache control apparatus which controls address mapping of a cache memory.

2. Description of the Prior Art

In a high performance computer system, a cache memory which has a smaller storage capacity and a shorter access time than a main memory is interposed between a CPU (Central Processing Unit) or a central control unit (CC) and the main memory. High speed memory accessing from the CPU or the central control unit can be achieved by storing part of stored contents of the main memory into the cache memory. Mapping of data in the main memory to data in the cache memory is performed by each block of a predetermined size as a mapping unit. As methods of mapping, direct mapping (congruent mapping), full associative mapping, set associating mapping and so forth are known. Whichever mapping method is employed, one block of the cache memory corresponds to a plurality of blocks of the main memory. In the present specification, central control units comprehend CPUs.

Further, the cache memory is used, as a disk cache, also for an external storage apparatus such as a disk apparatus. Also in the case of the disk cache, a mapping method is determined in a similar manner as described above.

In order to raise the hit ratio to the cache memory, it is necessary to decide on data to be stored into the cache memory and to dynamically update the data as the program proceeds. In the case of the memory cache, data of a block of the cache memory are replaced with data of one of a plurality of blocks of the main memory corresponding to the block of the cache memory. The algorithm for such replacement is called mapping algorithm. The mapping algorithm is also called block replacement algorithm, and as representative mapping algorithms, a LRU (least recently used) algorithm, a random algorithm, a FIFO (First-in First-out) algorithm and a LFU (least frequently used) algorithm are known. Since a high speed operation is demanded for the cache memory, the mapping algorithm is generally realized by hardware.

A cache control apparatus is an apparatus which controls address mapping of the cache memory in accordance with a mapping method. In particular, when the cache control apparatus receives an address from the central control unit, it discriminates whether or not the data of the address is present in the cache memory. The cache control apparatus converts the given address into an address of the cache memory when the data of the address is present in the cache memory. Further, the cache control apparatus executes updating of a block of the cache memory in accordance with the mapping algorithm provided therein. Since a conventional cache control apparatus is provided with only one mapping algorithm, mapping of the cache memory address is determined decisively, and also the replacement of a block in the cache memory is limited to one way.

However, the mapping algorithm by which a maximum hit ratio can be obtained is different, in the case of the memory cache, depending upon the construction of a program to be executed or the characteristic of data to be handled, and in the case of the disk cache, depending upon the allocation or the size of a file. Consequently, with a conventional cache control apparatus, it is difficult to improve the hit ratio to the cache memory under a condition different from the condition on which the mapping algorithm provided in the apparatus is based. Further, even when a result of actual measurement of the hit ratio to the cache memory is lower than an expected value, a conventional cache control apparatus has only such a countermeasure as to instruct the software of how to use the apparatus. Further, since a measurement of the cache hit ratio on an actual apparatus is not performed for all cache access patterns, there is a problem in that a difference arises in cache hit ratio depending upon the system.

Japanese Patent Laid-Open Application No. Hei-4-209049 (JP. A. 4-209049) discloses a technique which allows, in cache memory, address mapping based on the direct mapping method. The direct mapping method changes the position of a bit in address data used for mapping of blocks between the main memory and the cache memory, thereby preventing the hit ratio from being lowered extremely in response to the amount of memory access. This technique, however, is based on the direct mapping method, and it is not disclosed to adaptively change the position of a bit which is used for mapping of blocks.

SUMMARY OF THE INVENTION

It is an object of the present invention to provide a cache control apparatus wherein a mapping algorithm to be used can be changed dynamically so that, even if a change of a program or data, a change of the file format or a change of the environment of use occurs, a high hit ratio can be maintained and the performance of a system can be improved.

The object of the present invention is achieved by a cache control apparatus for use with a system which includes a central control unit, an address bus over which access address data is outputted from the central control unit, a data bus connected to the central control unit, and a cache memory connected to the data bus and including a tag memory for storing an address tag and a data memory connected to the data bus for storing block data, the cache control apparatus comprising an address register connected to the address bus for storing the access address data; a plurality of mapping controllers individually provided for a plurality of different mapping algorithms each for producing a set address and an address tag in response to an output of the address register; a mapping algorithm controller for selecting one of the plurality of mapping controllers and outputting a selector control signal corresponding to the selected mapping controller; a first selector for selecting one of the set addresses outputted from the plurality of mapping controllers in response to the selector control signal and outputting the selected set address to the tag memory and the data memory; a second selector for selecting one of the address tags outputted from the plurality of mapping controllers in response to the selector control signal; a comparison circuit for comparing the address tag outputted from the second selector and an address tag outputted from the tag memory with each other; a hit discrimination circuit for discriminating a cache hit based on a result of the comparison by the comparison circuit; and hit ratio calculation means for calculating a cache hit ratio based on a result of the cache hit discrimination; the mapping algorithm controller selecting one of the plurality of mapping controllers based on the cache hit ratio calculated by the hit ratio calculation means.

The above and other objects features and advantages of the present invention will be apparent from the following

3 description referring to the accompanying drawings which illustrate examples of preferred embodiments of the present invention.

DESCRIPTION OF THE PREFERRED EMBODIMENTS

First Embodiment

Here, description is given of a cache control apparatus which is based on two-way set associative mapping and wherein one of four different mapping algorithms is adaptively selected to control address mapping of a cache memory.

Figure 1:
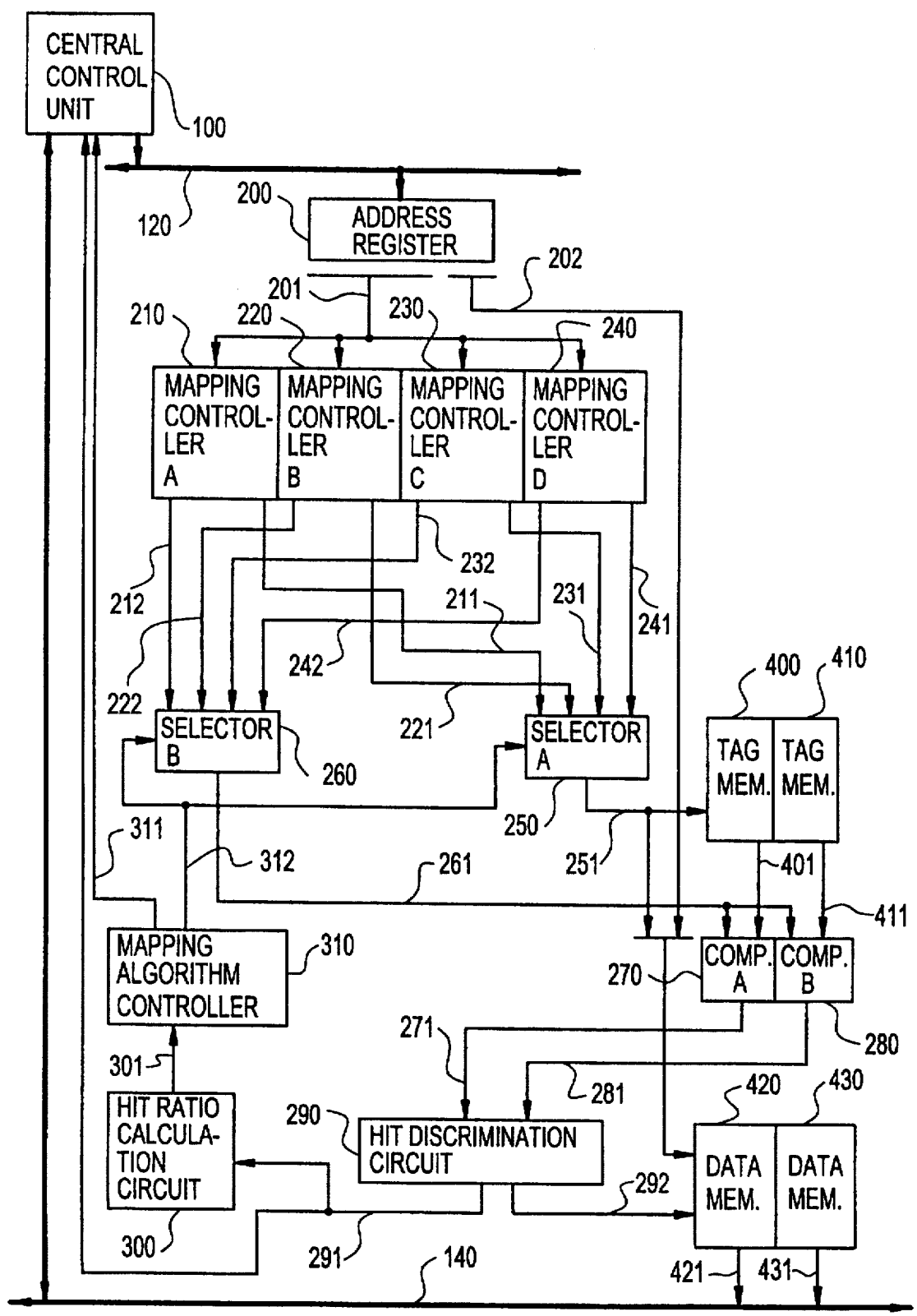
FIG. 1 is a block diagram showing the construction of a cache control apparatus of a first embodiment of the present invention.

Referring to FIG. 1, an address bus 120 and a data bus 140 are connected to a central control unit 100. Since the two-way set associative mapping is employed, a cache memory is formed from a data memory 420 of a first compartment and another data memory 430 of a second compartment. Further, a tag memory 400 of the first compartment and another tag memory 410 of the second compartment are provided corresponding to the data memories 420 and 430, respectively. The tag memories 400 and 410 hold tag data to blocks stored in the data memories 420 and 430 as address tags, respectively. The data memories 420 and 430 are connected to the data bus 140 so that block data 421 and 431 stored in the data memories 420 and 430 are outputted to the data bus 140, respectively.

An address register 200 for fetching access address data on the address bus 120 is connected to the address bus 120. The access address data is formed from a block address field 201 and an intra-block address field 202.

In order to allow control with the four different mapping algorithms, four mapping controllers 210, 220, 230 and 240 are provided. The block address field 201 of the access address data is supplied to the mapping controllers 210, 220, 230 and 240. Then, the first mapping controller A 210 produces a set address 211 and tag data 212 using the first mapping algorithm; the second mapping controller B 220 produces a set address 221 and tag data 222 using the second mapping algorithm; the third mapping controller C 230 produces a set address 231 and tag data 232 using the third mapping algorithm; and the fourth mapping controller D 240 produces a set address 241 and tag data 242 using the fourth mapping algorithm.

The cache control apparatus further includes a selector A 250 for selecting one of the set addresses 211, 221, 231 and 241 outputted from the mapping controllers 210, 220, 230 and 240, and a selector B 260 for selecting one of the tag data 212, 222, 232 and 242. The selectors 250 and 260 are controled by a selector control signal 312 which will be hereinafter described. A set address 251 selected by the selector A 250 is supplied to the tag memories 400 and 410. Further, the set address 251 is combined with the intra-block address field 202 outputted from the address register 200 to form addresses, which are supplied to the data memories 420 and 430, respectively.

A pair of comparison circuits 270 and 280 are provided on the output sides of the tag memories 400 and 410, respectively. The comparison circuit A 270 compares the tag data of the first compartment outputted from the tag memory 400

4 and the tag data 261 selected by the selector B 260 and outputs a comparison result 271. Similarly, the comparison circuit B 280 compares the tag data of the second compartment outputted from the tag memory 410 and the tag data 261 from the selector B 260 and outputs a comparison result 281. The comparison results 271 and 281 are inputted to a hit discrimination circuit 290 for discriminating a cache hit. The hit discrimination circuit 290 outputs a cache hit discrimination result 291 and a data memory enable signal 292. The data memory enable signal 292 is a signal for instructing, when a cache hit is discriminated, the data memory of the compartment with which the cache hit has been discriminated to output data therefrom. The data memory enable signal 292 is outputted to the data memories 420 and 430.

The cache control apparatus further includes hit ratio calculation means 300 for calculating a hit ratio based on the cache hit discrimination result 291, and a mapping algorithm controller 310 for selecting a mapping algorithm based on a hit ratio 301 calculated by the hit ratio calculation means 300. The mapping algorithm controller 310 outputs the selector control signal 312 to the selectors 250 and 260 so that a set address and tag data obtained by the selected mapping algorithm may be outputted from the selector A 250 and the selector B 260, respectively. The mapping algorithm controller 310 further outputs a mapping changeover instruction 311 to the central control unit 100. Also the cache hit discrimination result 291 from the hit discrimination circuit 290 is inputted to the central control unit 100.

Next, operation of the cache control apparatus constructed in such a manner as described above will be described.

If the central control unit 100 outputs an object access address to the address bus 120, the access address is stored into the address register 200. Then, from the access address, the data of the block address field 201 is supplied to the mapping controllers 210, 220, 230 and 240. As a result, the mapping controllers 210, 220, 230 and 240 produce set addresses 211, 221, 231 and 241 and tag data 212, 222, 232 and 242, respectively, using the respective mapping algorithms. The set addresses 211, 221, 231 and 241 are inputted to the selector A 250 while the tag data 212, 222, 232 and 242 are inputted to the selector B 260.

It is assumed that, in an initial condition of the cache control apparatus, the first mapping algorithm, that is, the mapping controller A 210, is selected by the mapping algorithm controller 310. The mapping algorithm controller 310 outputs a selector control signal 312 for selecting the mapping controller A 210. The selector A 250 selects the set address 211 while the selector B 260 selects the tag data 212. The selected set address 211 is supplied as a set address 251 to the tag memories 400 and 410. The tag memory 400 of the first compartment outputs tag data 401 to the comparison circuit A 270 while the tag memory 410 of the second compartment outputs tag data 411 to the comparison circuit B 280. The tag data 401 and 411 both correspond to the set address 251. Meanwhile, the tag data 212 selected by the selector B 260 is outputted as tag data 261 to the comparison circuits 270 and 280. Consequently, the comparison circuit A 270 compares the tag data 261 and the tag data 401 to detect whether or not they coincide with each other, and outputs a result of the comparison as a comparison result 271. The comparison circuit B 280 compares the tag data 261 and the tag data 411 to detect whether or not they coincide with each other, and outputs a result of the comparison as a comparison result 281.

If the access address data outputted to the address bus 120 makes a cache hit to the data memory 420 of the first compartment, the comparison result 271 represents "coincidence", but if the access address data makes a cache hit to the data memory 430 of the second compartment, the comparison result 281 represents "coincidence". The hit discrimination circuit 290 discriminates based on the values of the comparison results 271 and 281 whether or not a cache hit has occurred, and outputs a cache hit discrimination result 291 to the hit ratio calculation means 300 and the central control unit 100. Further, the hit discrimination circuit 290 outputs a data memory enable signal 292 to enable the data memory of the compartment in which the hit has occurred. As a result, the data memory of the compartment in which the cache hit has occurred outputs to the data bus 140 data designated by an address which is represented by a combination of the set address 251 and the intra-block address field 202. Then, the central control unit 100 reads the data of the object access address from the data bus 140. When no cache to the data memories 410 and 420 hit occurs, data of the object access address is read in from the main memory via the data bus 140.

Memory accesses from the central control unit 100 are performed repetitively in such a manner as described above. In the meantime, the hit ratio calculation means 300 calculates, based on the cache hit discrimination result 291, a hit ratio 301 from the number of times by which a hit discrimination has been performed and the number of hit times in the number of hit discrimination times. The hit ratio 301 thus calculated is notified to the mapping algorithm controller 310 each time the number of hit discrimination times reaches a predetermined number.

The mapping algorithm controller 310 notifies a mapping change-over instruction 311 to the central control unit 100 and outputs a selector control signal 312 to change over the selected mapping controller from the mapping controller A 210 to another mapping controller when it discriminates that the inputted hit ratio 301 is lower than an expected value determined in advance. In particular, the mapping algorithm controller 310 outputs to the selectors 250 and 260 a selector control signal 312 for selecting a mapping controller other than the mapping controller A 210. Here, it is assumed that the second mapping algorithm is selected and the selectors 250 and 260 are changed over so that they may select a set address 221 and tag data 222 outputted from the mapping controller B 220. The central control unit 100 invalidates the cache memory by the mapping change-over instruction 311 and then performs accessing to the cache memory based on the second mapping algorithm by the mapping controller B 220.

Also when the hit ratio obtained with the second mapping algorithm is lower than the expected value, for example, the third mapping algorithm is selected in such a manner as described above.

As described above, the cache control apparatus of the first embodiment provides a plurality of mapping algorithms and, when the cache hit ratio is lower than an expected value, automatically changes the mapping algorithm to be used. As a result, (1) in the case of the memory cache wherein a block of a main memory is stored into a cache memory, even if a change in order of access blocks is caused by the construction of a program used or (2) in the case of the disk cache, even if a change of a cache access block of the central control unit is caused by an allocation or a size of a file or a change or a difference of the construction of a system, since, with the cache control apparatus of the present embodiment, a mapping algorithm adapted to an actual cache access pattern is selected dynamically, improvement in cache hit ratio can be achieved and improvement in performance of the system can be achieved. Such selection of a mapping algorithm as described above is performed without the necessity for a change of a file of a program including the software, a restriction to the method of use of the cache control apparatus, a change of the hardware and so forth.

Second Embodiment

Figure 2:
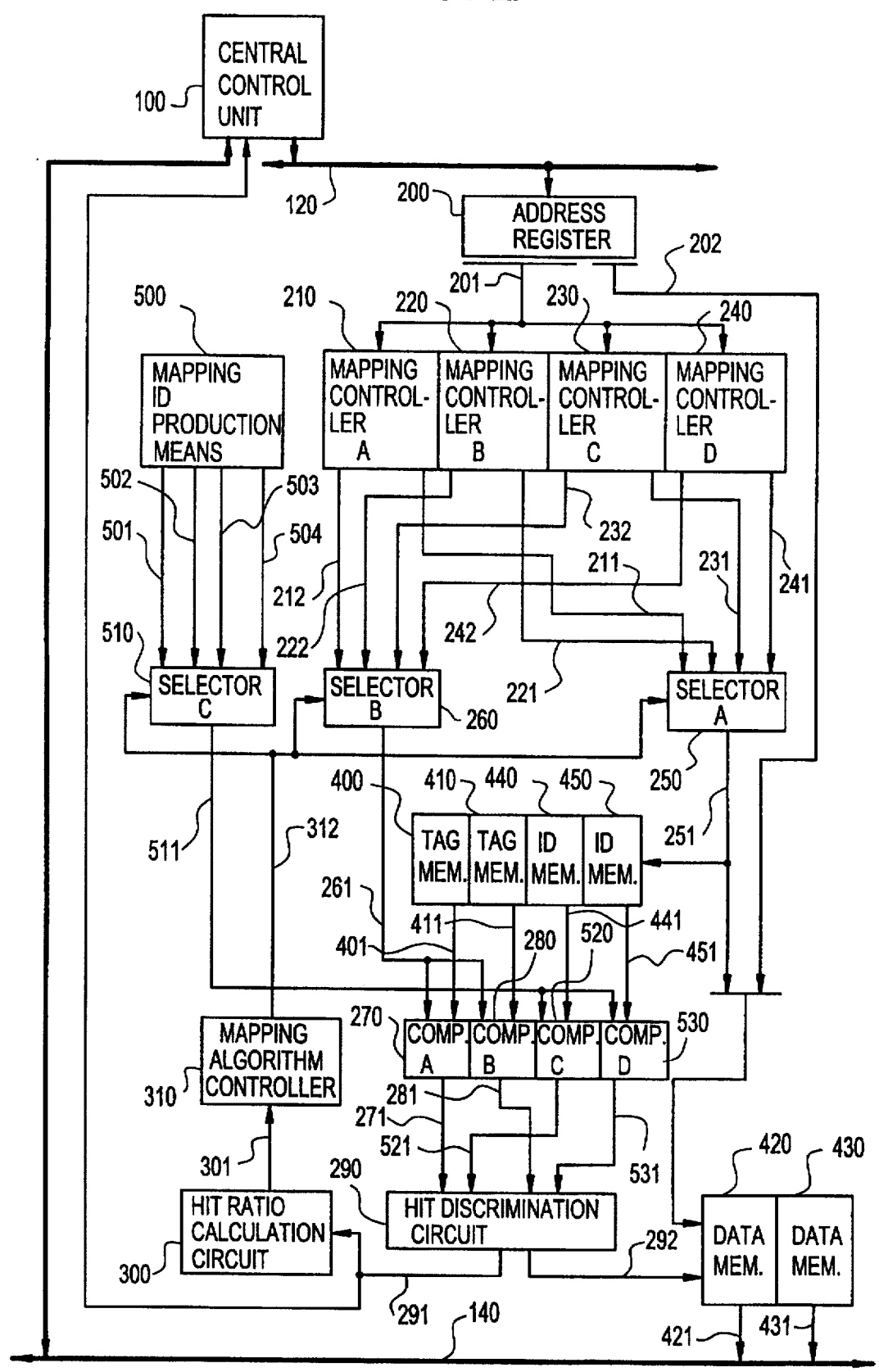
FIG. 2 is a block diagram showing the construction of a cache control apparatus of a second embodiment of the present invention.

A cache control apparatus of the second embodiment of the present invention shown in FIG. 2 is a modification to the cache control apparatus of the first embodiment shown in FIG. 1 and additionally includes mapping ID production means 500 for producing identification (ID) codes 501 to 504, a selector C 510 for selecting one of the identification codes 501 to 504 in accordance with the selector control signal 312 and outputting the selected identification code as an identification code 511, a pair of ID memories 440 and 450 for storing identification codes 441 and 451 for the respective compartments, a comparison circuit C 520 for comparing the identification code 441 outputted from the ID memory 440 of the first compartment and the identification code 511 outputted from the selector C 510 and outputting a result of the comparison as a comparison result 521, and a comparison circuit D 530 for comparing the identification code 451 outputted from the ID memory 450 of the second compartment and the identification code 511 outputted from the selector C 510 and outputting a result of the comparison as a comparison result 531. No mapping change-over instruction is outputted from the mapping algorithm controller 310 to the central control unit 100. The hit discrimination circuit 290 receives the comparison results 271, 281, 521 and 531 from the comparison circuits 270, 280, 520 and 530, respectively. The set address 251 outputted from the selector A 250 is supplied also to the ID memories 440 and 450.

Of the identification codes produced by the mapping ID production means 500, the identification code 501 represents mapping by the mapping controller A 210; the identification code 502 represents mapping by the mapping controller B 220; the identification code 503 represents mapping by the mapping controller C 230; and the identification code 504 represents mapping by the mapping controller D 240. Each of the ID memories 450 and 460 is used to indicate by which mapping algorithm data of each block in the data memory 420 or 430 has been fetched into the cache memory for each set address. Accordingly, each time updating of a block in the cache memory occurs, data of the identification code of a corresponding set address is updated. Further, the selector C 510 outputs an identification code corresponding to a mapping algorithm selected at present in response to the selector control signal 312.

Operation of the cache control apparatus having such a construction as described above will be described below. Here, it is assumed that, in an initial condition of the cache control apparatus, the mapping controller A 210 is selected in response to the selector control signal 312, similarly as in the first embodiment.

When the central control unit 100 outputs an object access address to the address bus 120, in a similar manner as in the control apparatus of the first embodiment described above, the tag data 261 selected by the selector B 260 is compared with the tag data 401 outputted from the tag memory 400 of the first compartment by the comparison circuit A 270, and is compared with the tag data 411 from the tag memory 410 of the second compartment by the comparison circuit B 280. Simultaneously, the selector C 510 selects, in response to the selector control signal 312, the identification code 501 indicative of the mapping controller A 210 selected at present and outputs the selected identification code 501 as an identification code 511. Then, the identification code 511 is compared by the comparison circuit C 520 with an identification code 441 from the ID memory 440 of the first compartment, and is compared by the comparison circuit D 530 with another identification code 451 from the ID memory 450 of the second compartment. Here, the identification codes 441 and 451 correspond to a set address 251 outputted from the selector A 250.

The hit discrimination circuit 290 discriminates a cache hit in the first compartment when both the comparison result 271 from the comparison circuit A 270 and the comparison result 521 from the comparison circuit C 520 represent "coincidence". When only the comparison result 271 represents "coincidence", that is, when, even if data of the given access address is present in the cache memory, the data has been obtained using a mapping algorithm different from the mapping algorithm used at present, no cache hit occurs. Similarly, the hit discrimination circuit 290 discriminates a cache hit in the second compartment when both the comparison result 281 from the comparison circuit B 280 and the comparison result 531 from the comparison circuit D 530 represent "coincidence". Then, similarly as in the first embodiment described above, the hit discrimination circuit 290 outputs a hit discrimination result 291 and a data memory enable signal 292.

The hit ratio calculation means 300 calculates a hit ratio in a similar manner as in the first embodiment. The mapping algorithm controller 310 outputs, when the hit ratio 301 is lower than an expected value, a selector control signal 312 to the selectors 250, 260 and 510 to select another mapping algorithm. For example, when the second mapping algorithm is to be selected, the selector control signal 312 is formed so as to indicate to select the output of the mapping controller B 220 by the selector A 250 and the selector B 260 and select the identification code 502 corresponding to the mapping controller B 220 by the selector C 510.

In the present embodiment, a cache hit is discriminated taking into consideration which mapping algorithm has been used to obtaine the data, and even if data of a corresponding block is included in the cache memory, a cache hit is not determined if the data has not been obtained using the same mapping algorithm as the mapping algorithm used at present. As a result, when the applied mapping algorithm is changed, a block obtained based on the preceding mapping algorithm used prior to the change does not make a cache hit, and consequently, invalidation of the cache need not be performed at a change of the mapping algorithm. Accordingly, the central control unit 100 can continue its accessing to the cache memory without taking notice of changing over between mapping algorithms, and further improvement in performance of the system can be anticipated comparing with the first embodiment.

It is to be understood that variations and modifications of the cache control apparatus disclosed herein will be evident to those skilled in the art. It is intended that all such modifications and variations be included within the scope of the appended claims.

What is claimed is:

1. A cache control apparatus for use with a system which includes a central control unit, an address bus over which access address data is outputted from said central control unit, a data bus connected to said central control unit, and a cache memory connected to said data bus and including a tag memory for storing an address tag and a data memory connected to said data bus for storing block data, said cache control apparatus comprising:

an address register connected to said address bus for storing the access address data;

a plurality of mapping controllers individually provided for a plurality of different mapping algorithms each for producing a set address and an address tag in response to an output of said address register;

a mapping algorithm controller for selecting one of said plurality of mapping controllers and outputting a selector control signal corresponding to the selected mapping controller;

a first selector for selecting one of the set addresses outputted from said plurality of mapping controllers in response to the selector control signal and outputting the selected set address to said tag memory and said data memory;

a second selector for selecting one of the address tags outputted from said plurality of mapping controllers in response to the selector control signal;

a comparison circuit for comparing the address tag outputted from said second selector and an address tag outputted from said tag memory with each other;

a hit discrimination circuit for discriminating a cache hit based on a result of the comparison by said comparison circuit; and hit ratio calculation means for calculating a cache hit ratio based on a result of the cache hit discrimination;

said mapping algorithm controller selecting one of said plurality of mapping controllers based on the cache hit ratio calculated by said hit ratio calculation means.

2. The cache control apparatus according to claim 1, wherein, when the hit ratio is lower than an expected value, said mapping algorithm controller discriminates which one of the mapping algorithms should be used for mapping of the cache memory address and outputs the selector control signal based on the discrimination.

3. The cache control apparatus according to claim 2, wherein said mapping algorithm controller outputs, upon changing over of the mapping algorithm to be used, a mapping change-over instruction to said central control unit, and said central control unit performs invalidating processing of the cache in response to the mapping change-over instruction.

4. The cache control apparatus according to claim 3, wherein said cache memory is a cache memory based on set associative mapping.

5. The cache control apparatus according to claim 1, further comprising mapping ID production means for producing a plurality of identification data corresponding to the plurality of mapping algorithms, a third selector for selecting one of the plurality of identification data in response to the selector control signal, an ID memory for storing, for each set address of said tag memory, identification data of the mapping algorithm which corresponds to the set address, and a second comparison circuit for comparing the identification data outputted from said third selector and the identification data outputted from said ID memory and outputting a result of the comparison to said hit discrimination circuit.

6. The cache control apparatus according to claim 5, wherein said hit discrimination detects a cache hit when said first comparison circuit detects coincidence of the tag data and said second comparison circuit detects coincidence of the identification data.

7. The cache control apparatus according to claim 6, wherein said cache memory is a cache memory based on set associative mapping.

* * * * *